United States Patent [19]

Ikuma

[11] Patent Number: 5,395,084
[45] Date of Patent: Mar. 7, 1995

[54] CUP HOLDER FOR AUTOMOBILE
[75] Inventor: Masahiro Ikuma, Hamamatsu, Japan
[73] Assignee: Suzuki Motor Corporation, Shizuoka, Japan
[21] Appl. No.: 69,098
[22] Filed: May 28, 1993
[30] Foreign Application Priority Data
  Sep. 7, 1992 [JP] Japan .................. 4-238220
[51] Int. Cl.⁶ .............................. A47K 1/08
[52] U.S. Cl. .................... 248/311.2; 224/42.44; 248/298
[58] Field of Search ........ 248/311.2, 298, 314, 248/316.8, 309.1; 224/42.44, 42.43; 297/194
[56] References Cited

U.S. PATENT DOCUMENTS

| 3,606,112 | 9/1971 | Cheshire | 224/42.44 |
| 4,738,423 | 4/1988 | DiFilippo et al. | 248/311.2 |
| 4,826,058 | 5/1989 | Nakayama | 224/42.44 |
| 5,087,008 | 2/1992 | Miller et al. | 248/311.2 |
| 5,092,652 | 3/1992 | Macaluso | 248/311.2 X |
| 5,259,580 | 11/1993 | Anderson et al. | 248/311.2 |

FOREIGN PATENT DOCUMENTS

| 0463306 | 1/1992 | European Pat. Off. | 224/42.44 |
| 61-23480 | 7/1986 | Japan . | |

*Primary Examiner*—Ramon O. Ramirez
*Attorney, Agent, or Firm*—Arnold, White & Durkee

[57] ABSTRACT

In a cup holder for an automobile which slidably holds a cup hold plate in a guide and has a spring mounted on the floor of the guide to press the cup hold plate against the ceiling of the guide, a means for preventing the tilting of the cup hold plate is provided on the lower surface of the cup hold plate so as to abut against the floor of the guide, or a means for preventing the tilting of the cup hold plate is provided on the guide so as to abut against the lower surface of the cup hold plate guide.

1 Claim, 5 Drawing Sheets

CUP HOLDER FOR AUTOMOBILE

FIELD OF THE INVENTION AND RELATED ART STATEMENT

The present invention relates to a cup holder for automobile. The instrument panel of an automobile is often provided with a cup holder a as shown in FIG. 9. A publicly known cup holder a is, for example as shown in FIGS. 7 and 8, so constructed that a cup hold plate c is inserted in a guide b so as to be slidably held by the guide b and a spring d is mounted on the floor of the guide b to press the cup hold plate c against the ceiling of the guide b.

In this cup holder, a spring d must be moderately springy in order for the cup hold plate c to be smoothly pulled out and withdrawn. For this reason, when the cup hold plate c is pulled from the guide b and used by inserting a cup in a cup support hole e, the cup hold plate c tilts as indicated by the dashed line in FIG. 8 when the automobile is driven. This tilting is undesirable in use.

OBJECT AND SUMMARY OF THE INVENTION

Accordingly, an object of the present invention is to provide a cup holder for an automobile which prevents the cup hold plate from tilting.

The above problem was solved by providing a cup holder for automobile which slidably holds a cup hold plate in a guide and has a spring mounted on the floor of the guide to press the cup hold plate against the ceiling of the guide, wherein a means for preventing the tilting of the cup hold plate is provided on the lower surface of the cup hold plate so as to abut against the floor of the guide, or a means for preventing the tilting of the cup hold plate is provided on the guide so as to abut against the lower surface of the cup hold plate.

DETAILED DESCRIPTION OF PREFERRED EMBODIMENT

Figure 1:
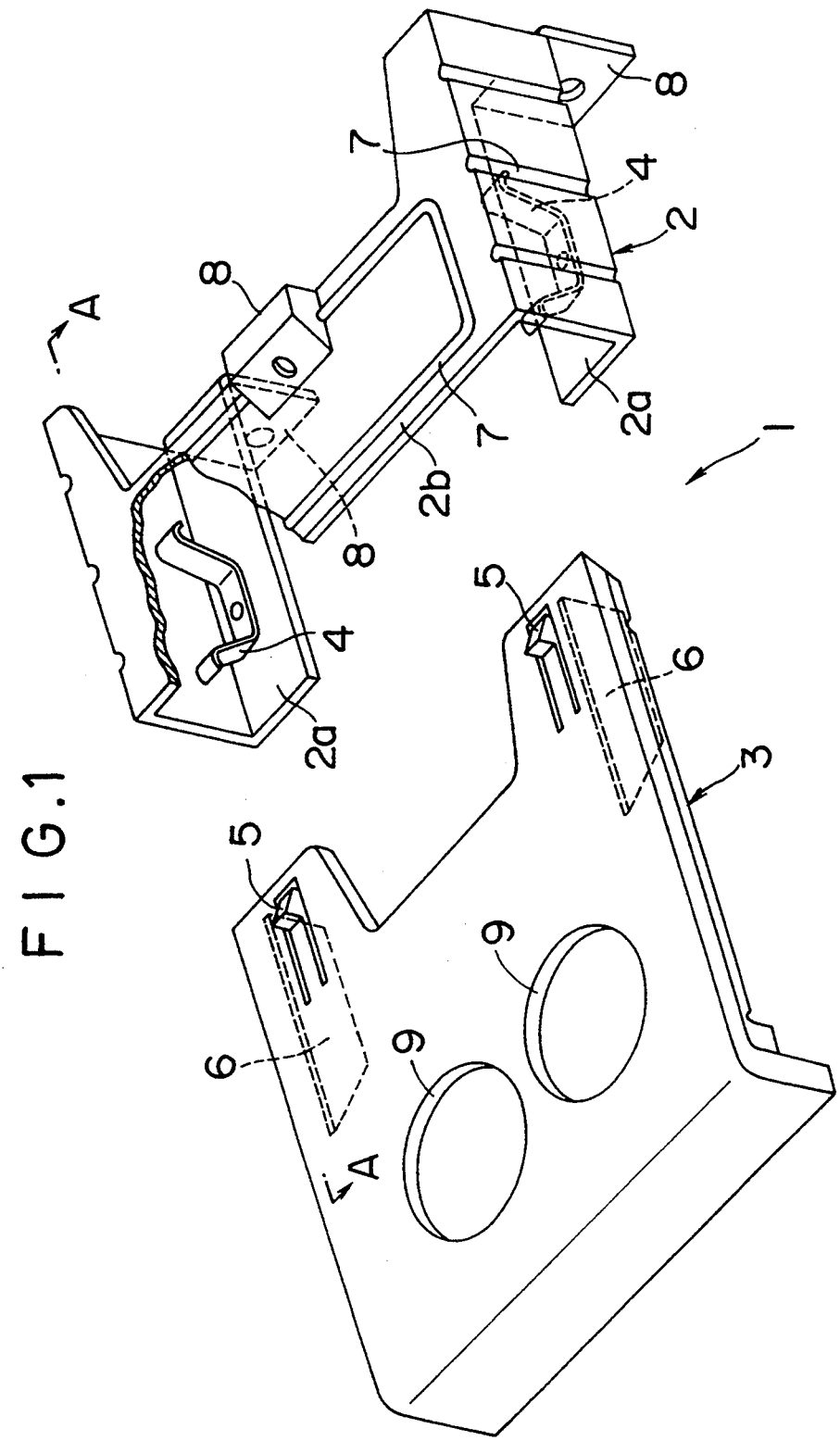
FIG. 1 is a partially cutaway perspective view of a cup holder of the present invention, showing the cup holder being disassembled.
Figure 2:
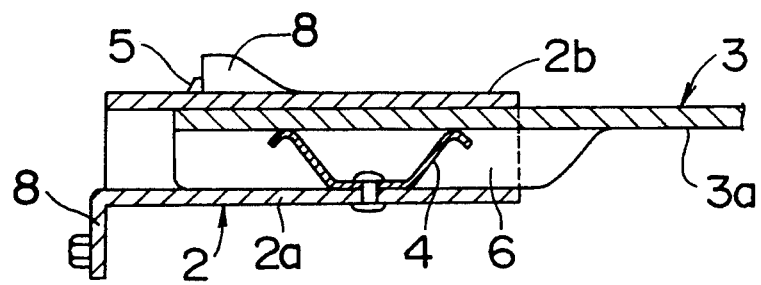
FIG. 2 is a sectional view taken along the line A—A of FIG. 1, showing the cup hold plate being inserted in the guide.

In FIGS. 1 and 2, reference numeral 1 denotes a cup holder of the present invention. This cup holder comprises a guide 2 and a cup hold plate 3. A pair of leaf springs 4, 4 are mounted at the right and the left on the floor 2a of the guide 2. When the cup hold plate 3 is inserted in the guide 2, the cup hold plate 3 is assembled to the guide 2 in such a manner that the cup hold plate 3 is pressed against the ceiling 2b of the guide 2 by the springs 4, 4. The stoppers 5, 5 disposed on the cup hold plate 3 are displaced downward when the cup hold plate 3 is inserted in the guide 2. When the cup hold plate 3 is pulled out, the plate 3 is pulled out to the position where the stoppers 5, 5 abut against the front edge of the guide 2.

On the lower surface 3a of the cup hold plate 3, a pair of ribs 6, 6 are formed at the right and the left integrally with the plate 3 as a means for preventing the tilting of the plate 3. These ribs are arranged in such a manner so as to protrude downwardly at both corners on the inside of the plate 3.

The height of each rib 6, 6 is so defined that there is an extremely small clearance between each rib 6, 6 and the floor 2a of the guide 2 so that the cup hold plate 3 can slide smoothly. Thus, when the cup hold plate 3 is in use, pulled out from the guide 2, the cup hold plate 3 is kept in the horizontal condition by the ribs 6, 6 abutting against the floor 2a of the guide 2, thereby preventing the tilting of the plate 3.

Incidentally, reference numeral 7 denotes a reinforcement bead disposed on the ceiling 2b and the side wall of the guide 2, numeral 8 denotes a bracket for installing the guide 2 to an instrument panel, and numeral 9 denotes a hole for inserting a cup.

In the above-described embodiment, a means for preventing the tilting of the cup hold plate 3 (ribs 6, 6) is installed on the cup hold plate 3. However, a similar effect is expected even if the means is provided on the guide 2.

Figure 3:
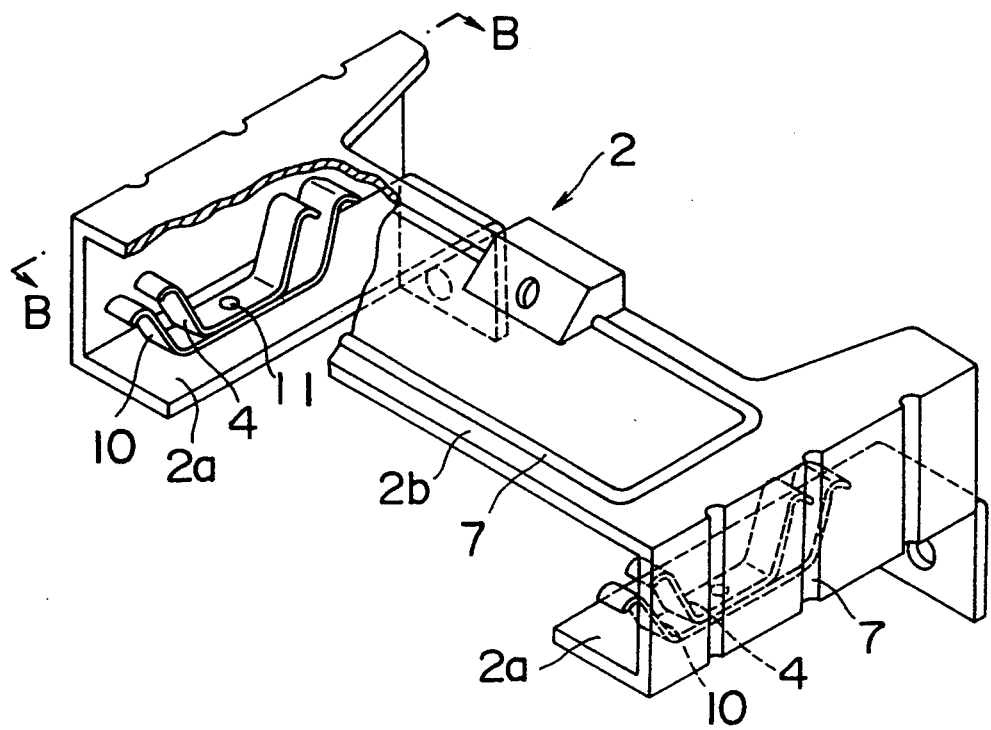
FIG. 3 is a partially cutaway perspective view of a modification of the guide shown in FIG. 1.

In the embodiment shown in FIG. 3, a spring 10 is fixed to the guide 2 with a rivet 11 together with a leaf spring 4 as a means for preventing the tilting of the cup hold plate 3. The spring 10 is highly springy, and the length thereof is sufficiently larger than the length of the leaf spring 4.

Figure 5:
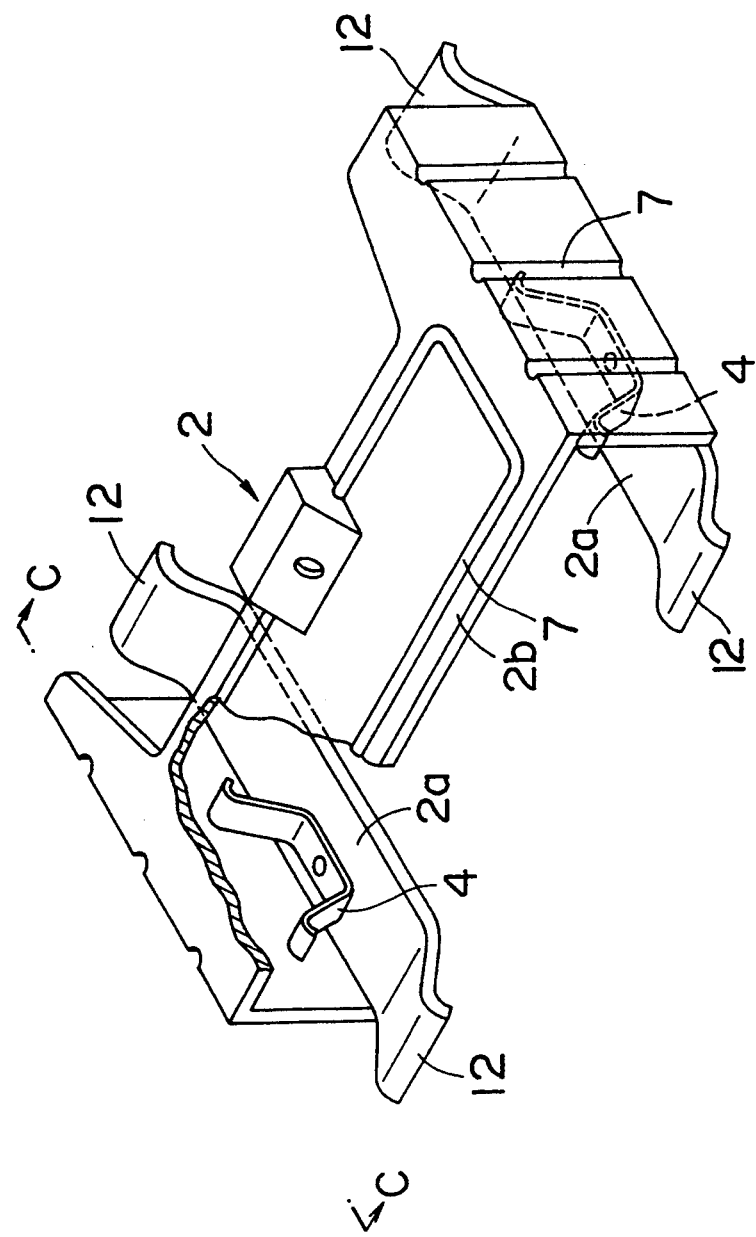
FIG. 5 is a partially cutaway perspective view of another modification of the guide shown in FIG. 5.

In the embodiment shown in FIG. 5, the front and rear ends of the floor 2a of the guide 2 are extended upward to form a means 12 for preventing the tilting of the cup hold plate 3.

In either embodiment, it is preferable that the tilt preventing means 10, 12 be either in light contact with the lower surface 3a of the cup hold plate 3, or that slight clearance be provided therebetween.

The shape and arrangement of the means for preventing the tilting of the cup hold plate 3 is not limited to those described above, and various modifications may be made.

Figure 4:
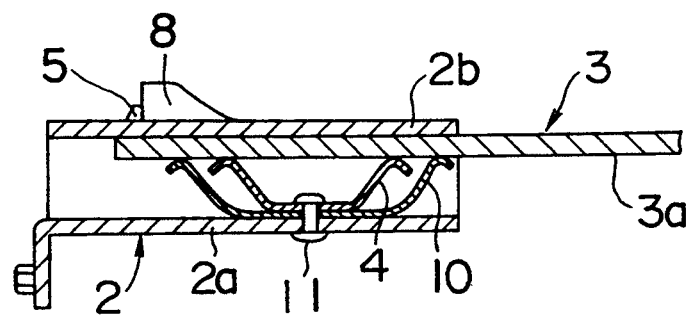
FIG. 4 is a sectional view taken along the line B—B of FIG. 3, showing the cup hold plate being inserted in the guide.
Figure 6:
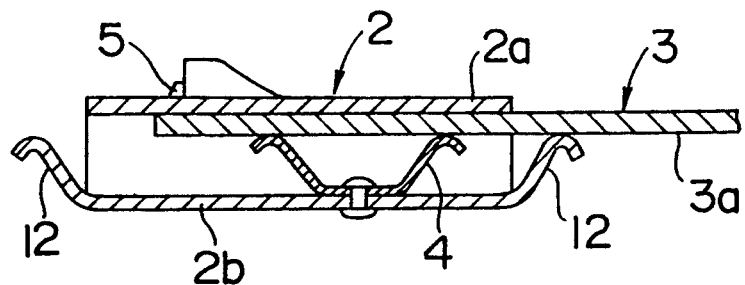
FIG. 6 is a sectional view taken along the line C—C of FIG. 5, showing the cup hold plate is inserted in the guide.
Figure 7:
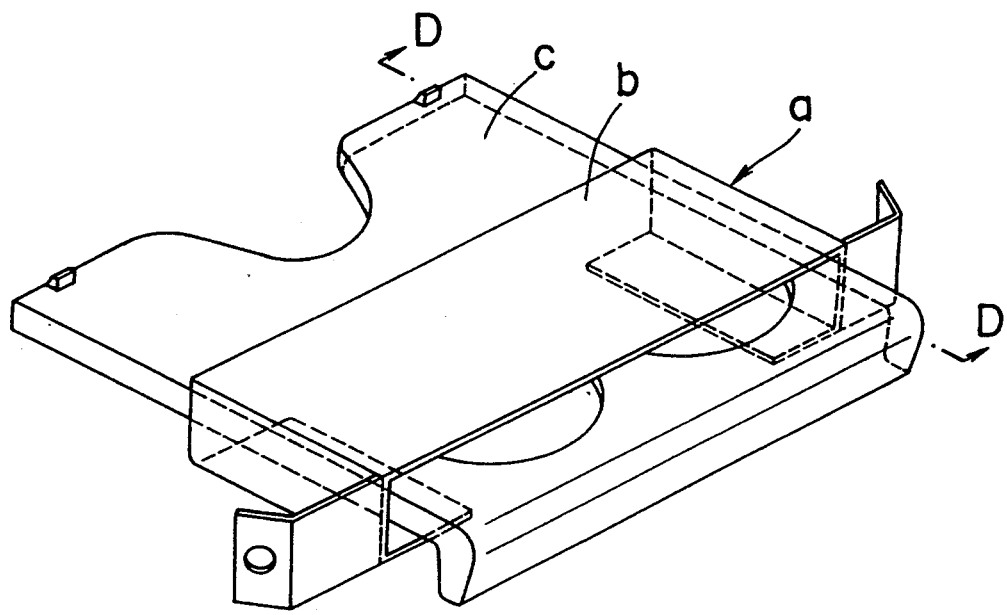
FIG. 7 is a perspective view of a conventional cup holder.
Figure 8:
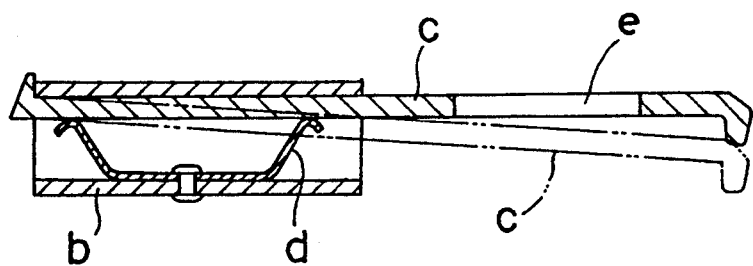
FIG. 8 is a sectional view taken along the line D—D of FIG. 7, showing the cup hold plate being pulled out.
Figure 9:
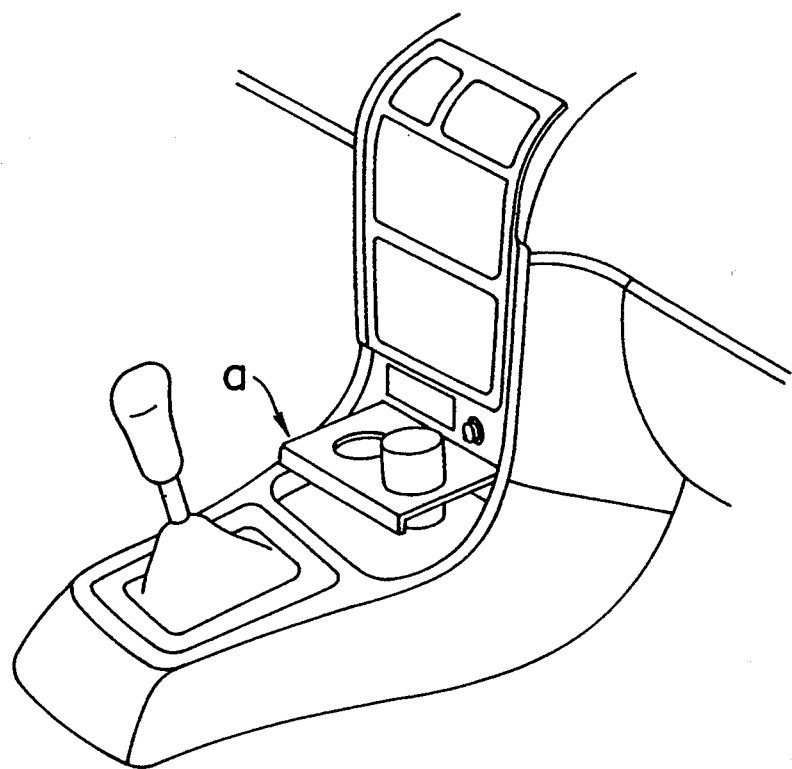
FIG. 9 is a perspective view showing the arrangement of a cup holder and the condition of use thereof.

As shown in FIG. 2, when the cup hold plate 3 is pulled from the guide 2, the bottoms of the right and left ribs 6, 6 are in contact with the floor 2a of the guide 2, thereby preventing the tilting of the cup hold plate 3. In the embodiments shown in FIGS. 4 and 6, the upper ends of the tilt preventing means 10, 12 are in contact with the lower surface of the cup hold plate 3, thereby preventing the tilting of the cup hold plate 3.

According to the present invention, the cup hold plate 3 can be pulled out and withdrawn smoothly by using a spring which is moderately springy. Moreover, the tilt preventing means provided on the cup hold plate or the guide prevents the cup hold plate from tilting, thereby the performance in use being improved.

I claim:

1. A cup holder for an automobile comprising a guide and a cup hold plate slidable in said guide, said guide having a lower floor and an upper ceiling, said cup holder plate having a spring mounted on the floor of said guide to press said cup hold plate against the ceiling of said guide, said cup holder having a means for preventing the tilting of said cup hold plate, said cup hold plate having upper and lower surfaces, said means being formed on the lower surface of said cup hold plate to abut against the floor of said guide, said means being positioned to abut against the floor of said guide even when said cup hold plate is extending outwardly in a position to hold a cup.

* * * * *